Oct. 5, 1971   H. J. FIEGEL, JR., ET AL   3,609,843
LOADING MACHINE FOR STRUCTURAL MEMBERS
Filed Jan. 28, 1969   6 Sheets-Sheet 1
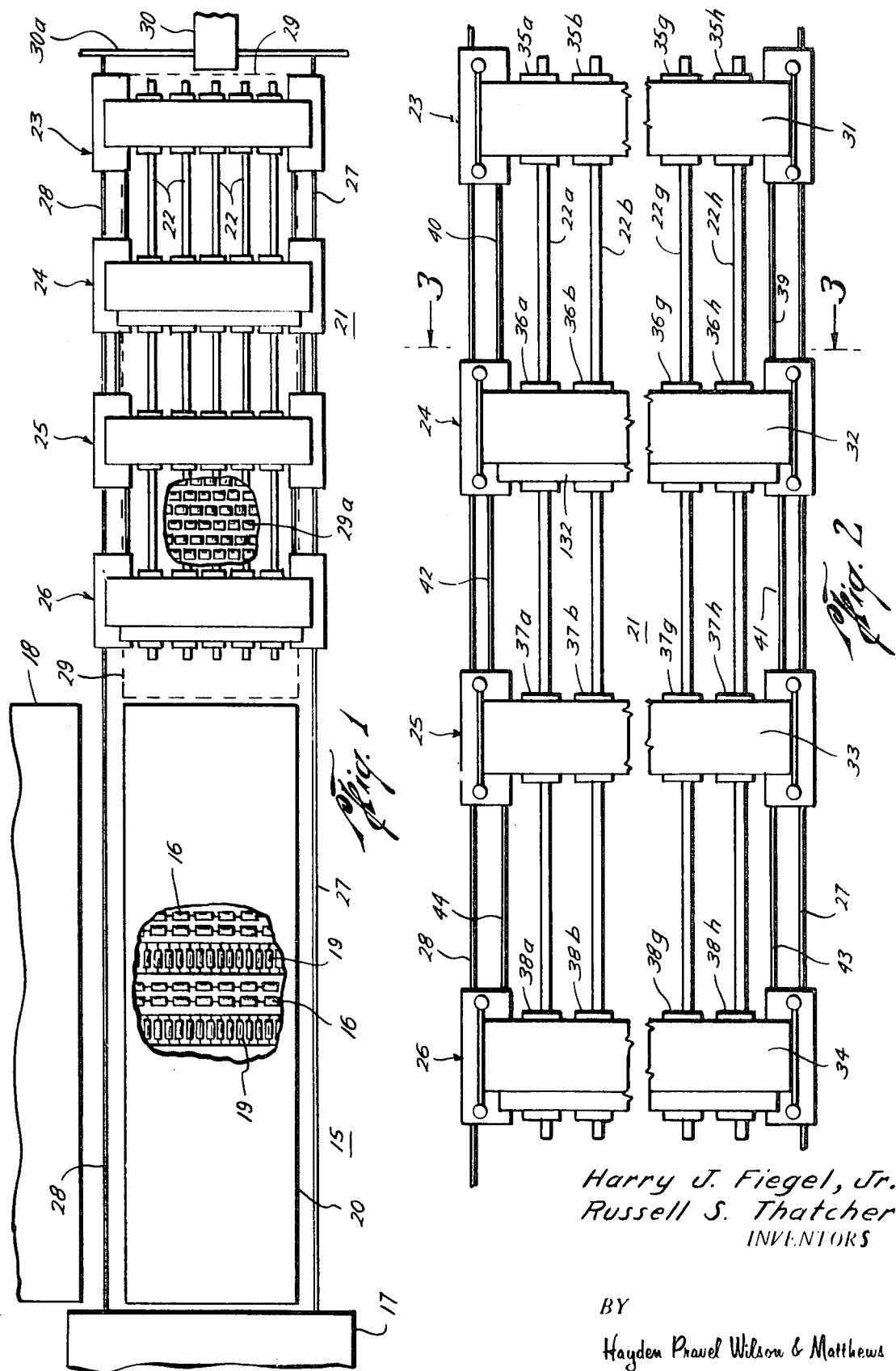
Harry J. Fiegel, Jr.
Russell S. Thatcher
INVENTORS
BY
Hayden Pravel Wilson & Matthews
ATTORNEYS

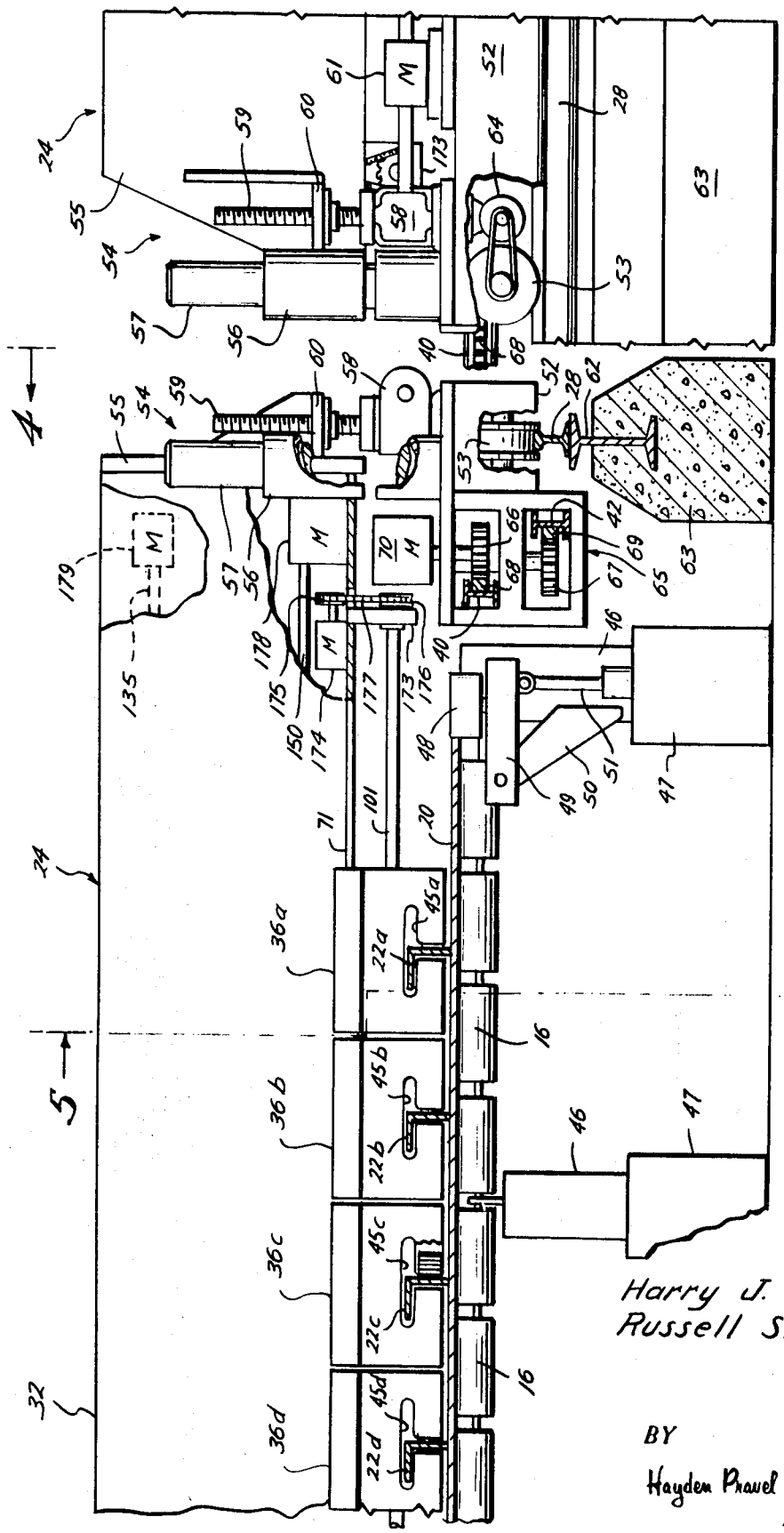

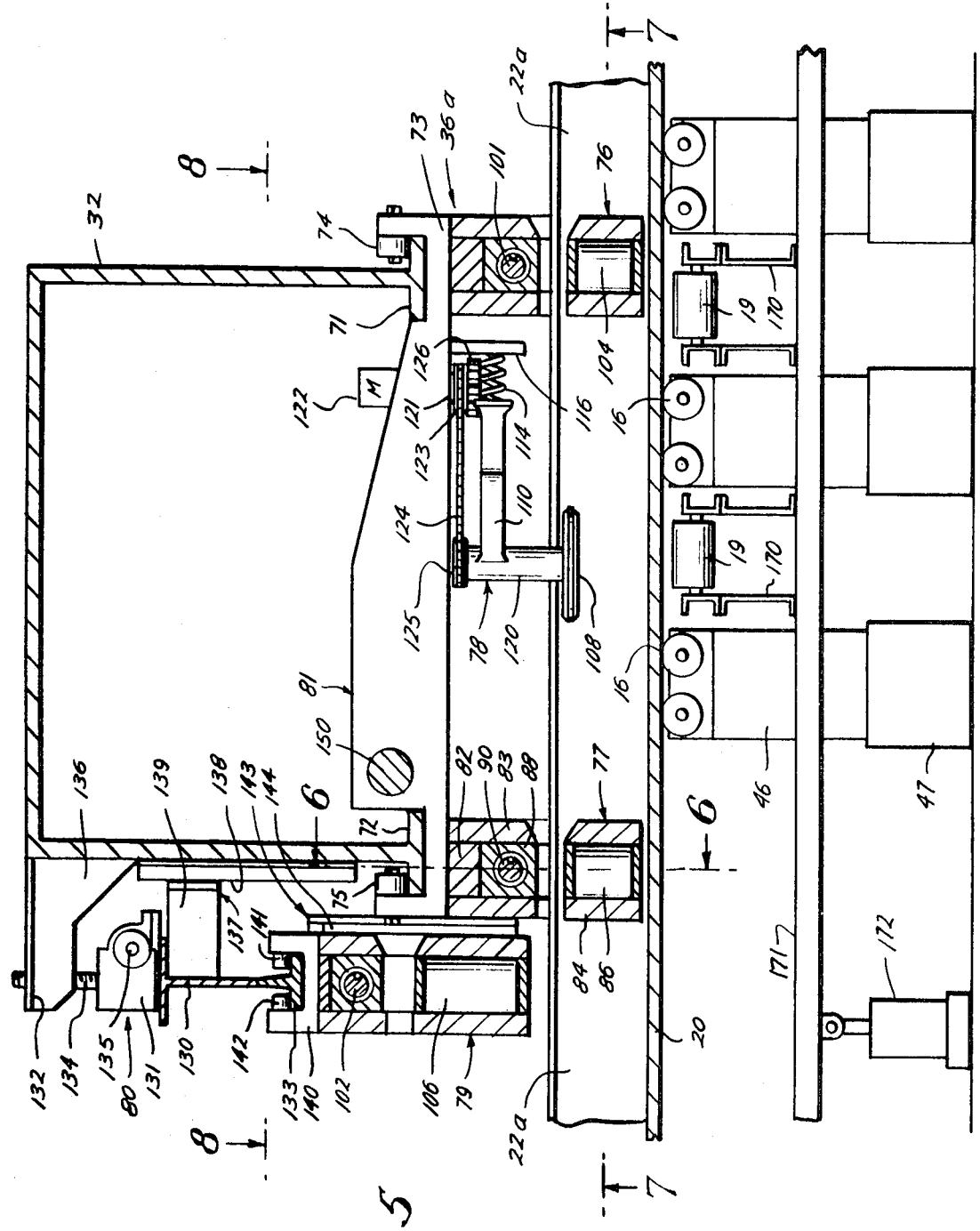

Harry J. Fiegel, Jr.
Russell S. Thatcher
INVENTORS

BY
Hayden Pravel Wilson & Matthews
ATTORNEYS

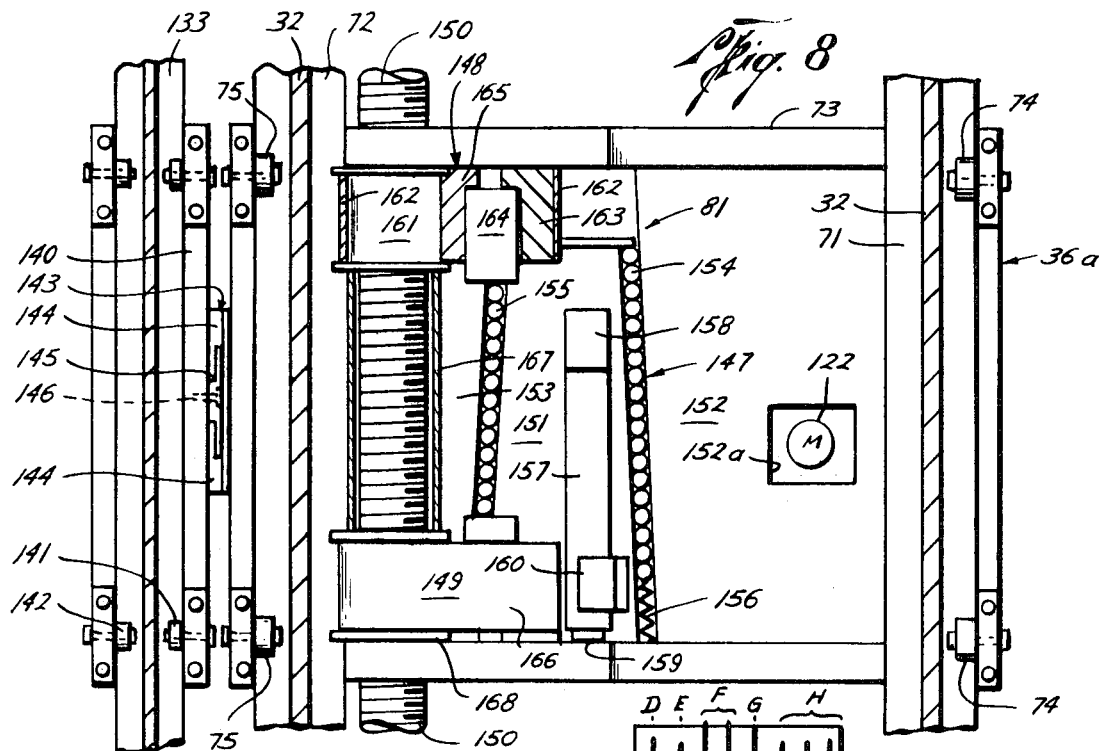
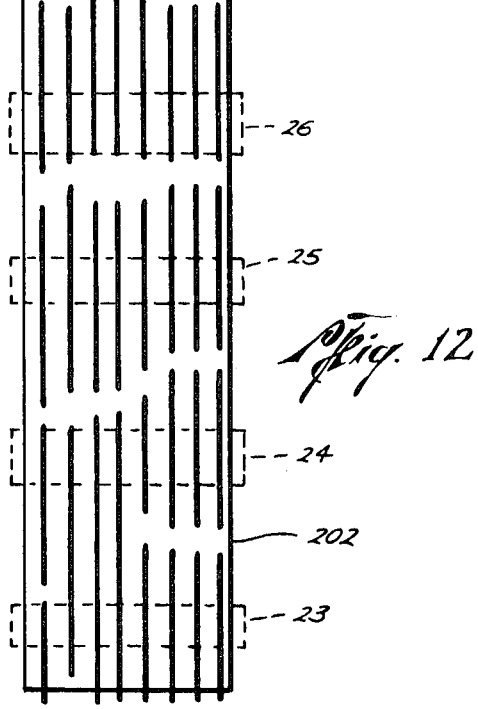
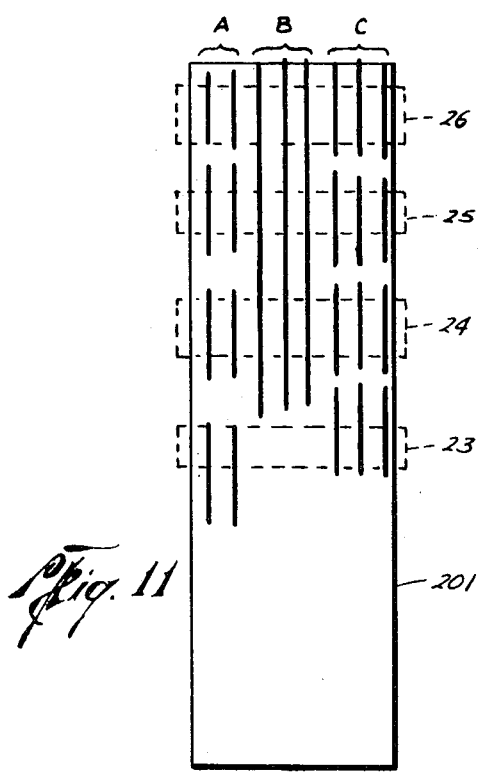

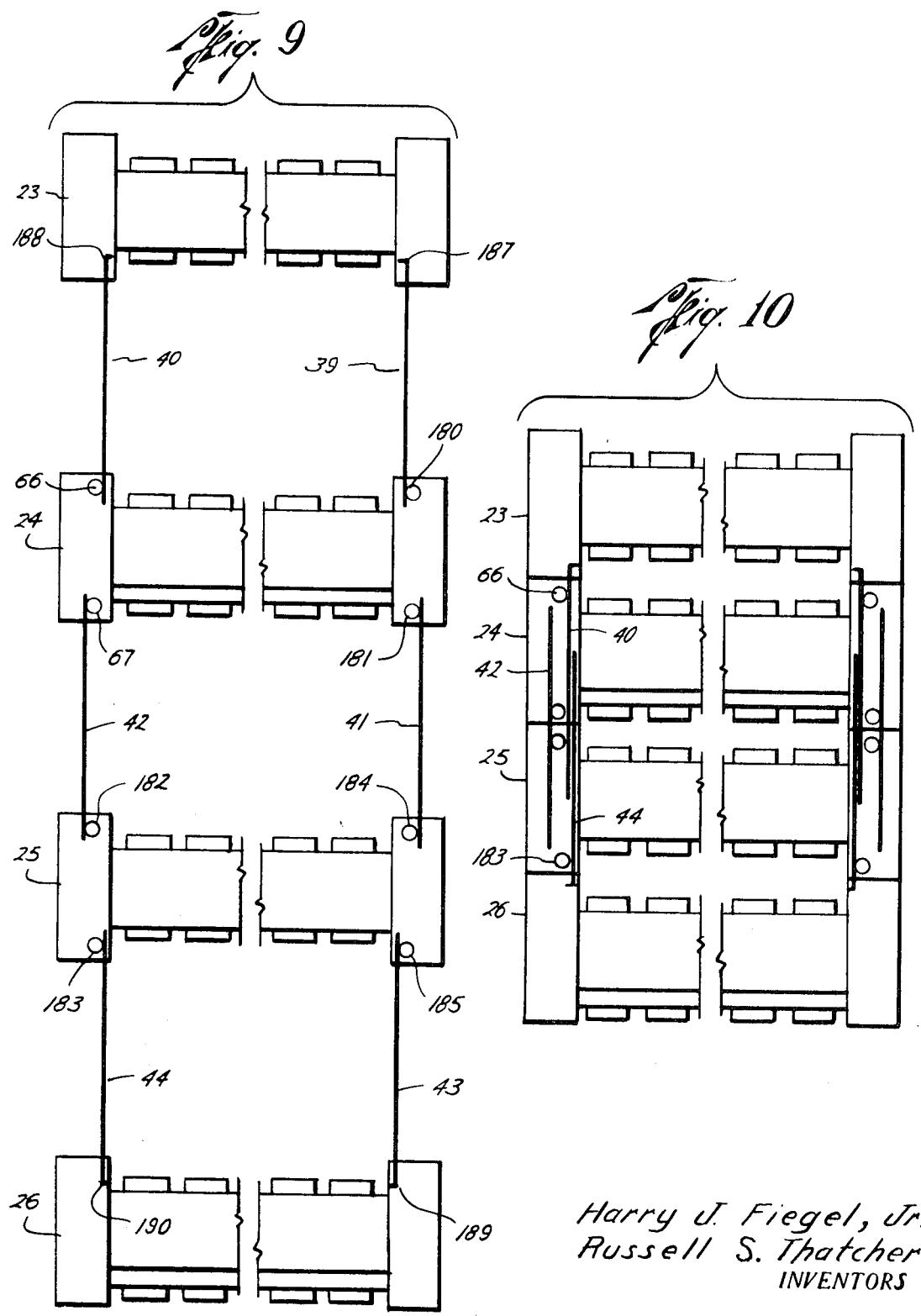

United States Patent Office 3,609,843
Patented Oct. 5, 1971

3,609,843
LOADING MACHINE FOR STRUCTURAL
MEMBERS
Harry J. Fiegel, Jr., Galveston, and Russell S. Thatcher,
Dallas, Tex., assignors to Kelso Marine Inc., Galveston, Tex.
Filed Jan. 28, 1969, Ser. No. 794,687
Int. Cl. B23p 19/00
U.S. Cl. 29—200 A                15 Claims

ABSTRACT OF THE DISCLOSURE

A machine for loading a group of structural steel shapes onto a steel plate and then feeding the combined load to a welding machine or other stage in a manufacturing operation. Plate loading apparatus moves a steel plate onto a conveyor loading station and shape loading apparatus thereafter moves from a shape receiving position to a position above the loading station for simultaneously placing a plurality of structural steel shapes onto the steel plate. The shape loading apparatus includes a group of interconnected carriages riding on tracks which straddle the loading station. Each carriage includes a series of shape positioning units located in a side-by-side manner in a transverse direction with respect to the carriage tracks. Each shape positioning unit is adapted to receive and hold a structural shape. Means are provided for varying the spacings between the carriages as well as the spacings between the individual shape positioning units on each carriage. This enables shapes to be placed on different plates in different configurations.

BACKGROUND OF THE INVENTION

This invention relates to machines for handling structural members and is particularly useful in the manufacture of reinforced structural panels.

Various types of building structures, industrial structures, ships, boats, and marine vessels, or major portions of such items, can be manufactured by combining series or groups of reinforced structural panels. Such panels would take the form of steel plates having a series of structural steel shapes, such as I-beams, T-beams, angles, channels and flat bars, attached thereto for reinforcing purposes. While such panels could be formed or fabricated by placing one structural shape at a time on the plate, holding it in the proper position and then welding it to the plate, such an approach would be relatively slow and relatively expensive in terms of labor requirements.

Structural panels of these types can be used in the manufacture of various items which are manufactured in relatively large quantities. An example would be the manufacture of marine barges or marine cargo vessels wherein it might be desired to manufacture a hundred or more of the barges or vessels during a single production run. In such a case, the various hull sections, bulkhead sections, etc. can be quickly formed by welding together various groups of these reinforced structural panels. In such cases, however, not only would it be necessary to manufacture a relatively large quantity of structural panels, but it would also usually be necessary to manufacture various different sizes of panels using different types of structural shapes with the shapes layed out in different configurations and with different spacings between the shapes.

In co-pending application Ser. No. 794,615, filed Jan. 28, 1969 in the names of Thatcher, Fiegel, Jr. and Linam and entitled "Panel Fitting and Welding Machine," there is described a new and improved welding machine for simultaneously welding a plurality of structural steel shapes to a steel plate. As described in such application, this welding machine may be loaded by placing each plate and each of the shapes into the welding machine one at a time in a manual manner. Such manual type of loading is slower than is desired in many instances and it would be desirable, therefore, to provide some better and more rapid means of feeding the shape and plate loads into such a welding machine.

SUMMARY OF THE INVENTION

It is an object of the invention, therefore, to provide a new and improved loading machine for use in manufacturing reinforced structural panels.

It is another object of the invention to provide a new and improved loading machine for rapidly placing groups of structural shapes in desired configurations on structural plates.

It is a further object of the invention to provide a new and improved loading machine for setting up and feeding structural shape and plate loads into a welding machine.

In accordance with one feature of the invention, a loading machine for structural members comprises a loading station and plate loading apparatus for moving a structural plate onto the loading station. The loading machine further includes shape loading apparatus for simultaneously moving a plurality of structural shapes onto the structural plate.

In accordance with another feature of the invention, the shape loading apparatus comprises a plurality of support carriages each including an elongated support beam and a plurality of shape positioning units supported by such support beam and positioned along the length of such support beam and individually adapted to receive and hold a structural shape. The different support beams are positioned parallel to one another and individual ones of the shape positioning units on any given carriage are adapted to be positioned in shape receiving alignment with individual ones of the shape positioning units on each of the other carriages. The shape loading apparatus further includes means for coupling the support carriages to one another for enabling such carriages to move in unison.

For a better understanding of the present invention, together with other and further objects and features thereof, reference is had to the following description taken in connection with the accompanying drawings, the scope of the invention being pointed out in the appended claims.

BRIEF DESCRIPTION OF THE DRAWINGS

Referring to the drawings:

FIG. 1 is a plan view of a loading machine constructed in accordance with the present invention;

FIG. 2 is an enlarged plan view of the shape loading apparatus portion of the FIG. 1 machine;

FIG. 3 is a cross-sectional view taken along section line 3—3 of FIG. 2 and showing a front elevational view of one of the support carriages;

FIG. 4 is a side elevational view taken along section line 4—4 of FIG. 3;

FIG. 5 is a side elevational type cross-sectional view taken along section line 5—5 of the support carriage structure of FIG. 3 and showing in greater detail the construction of one of the shape positioning units supported by such support carriage;

FIG. 8 is a cross-sectional view taken along section line

Figure 6:
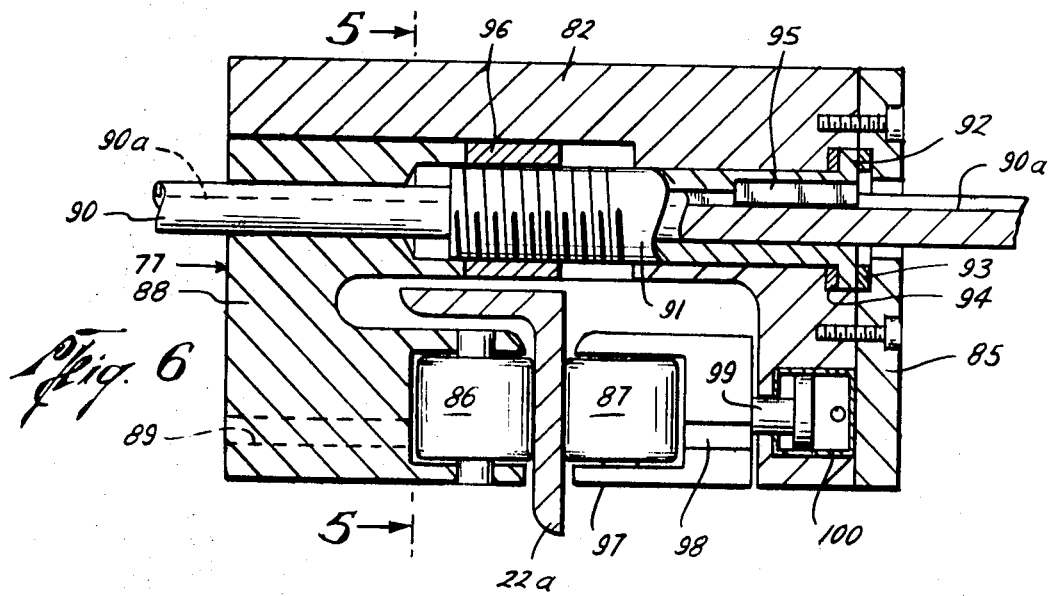
FIG. 6 is a cross-sectional view taken along section line 6—6 of FIG. 5 and showing the details of one of the guide roller mechanisms of FIG. 5.

8—8 of FIG. 5 and showing in greater detail a positioning unit spacing mechanism of the FIG. 5 structure;

FIG. 9 is a schematic representation of the shape loading apparatus showing the apparatus in a condition of maximum spacing between the carriages;

FIG. 10 is a schematic representation of the shape loading apparatus showing a condition of minimum spacing between the carriages;

FIG. 11 illustrates various patterns or configurations in which the shapes may be placed on the plate; and FIG. 12 illustrates further patterns or configurations in which the structural shapes may be placed on the structural plate.

DESCRIPTION OF THE PREFERRED EMBODIMENT

Referring to FIG. 1 of the drawings, there is shown a representative embodiment of a loading machine constructed in accordance with the present invention. This loading machine includes a loading station indicated generally at 15. This loading station 15 includes conveyor means represented by conveyor rollers 16 for moving a load to a further work station indicated at 17. The work station 17 may comprise a panel fitting and welding machine of the type described in the above-mentioned copending application Ser. No. 794,615 of Messrs. Thatcher, Fiegel, Jr. and Linam.

The loading machine of FIG. 1 further includes plate loading apparatus for moving a structural plate onto the conveyor rollers 16 of the loading station 15. This plate loading apparatus includes means indicated at 18 for supplying structural plates and conveyor means represented in part by conveyor rollers 19 for moving structural plates one at a time onto the loading station 15. A structural plate 20 is shown in position at the loading station 15. The mid-portion of the structural plate 20 is broken away to show some of the sets of conveyor rollers 16 which form a longitudinal conveyor system and some of the sets of conveyor rollers 19 which form a transverse conveyor system, both conveyor systems lying below the plate 20. The transverse conveyor system formed by rollers 19 cooperates with an appropriate conveyor system (not shown) associated with the plate supply means 18 for enabling movement of structural plates onto the loading station 15.

The FIG. 1 machine further includes shape loading apparatus indicated generally at 21 for simultaneously moving a plurality of structural shapes 22 onto the structural plate 20. The shape loading apparatus 21 includes a plurality of support carriages 23–26 which, in FIG. 1, are shown in a shape receiving position located to the right of the loading station 15. These support carriages 23–26 ride on a pair of carriage tracks 27 and 28 which run in a longitudinal direction from the right hand end of the shape receiving position to the left hand end of the loading station 15. such, these carriage tracks 27 and 28 straddle the loading station 15. A further conveyor system 29, the extremities of which are indicated by the broken line construction, extends the length of the shape receiving position and lies below the support carriages 23–26. Typical ones of the conveyor rollers for this conveyor system 29 are indicated at 29a. Neighboring transverse sets of these rollers 29a are staggered relative to one another to prevent the edges of structural shapes from falling into the spaces between adjacent rollers in any given set.

A machine 30 is located immediately to the right of the conveyor system 29 and operates at the appropriate times to feed structural shapes one at a time into the shape loading apparatus 21. This shape feeding machine 30 is constructed so that it can be moved in a transverse direction along a set of tracks, one of which is indicated at 30a. This enables the different shapes to be inserted at the proper transverse positions on the shape loading apparatus 21. This machine 30 may take the form of the machine described in co-pending application Ser. No. 755,342, filed on Aug. 26, 1968, now Pat. No. 3,527,363, granted Sept. 8, 1970 in the name of Thatcher and entitled "Apparatus for Rotating Structural Shapes."

When used hereinafter, the term "longitudinal" will be used to denote a direction which runs parallel to the carriage tracks 27 and 28 and the term "transverse" will be used to denote a direction which runs at right angles to the carriage tracks 27 and 28. Thus, the "longitudinal" direction is parallel to the direction of flow or direction of movement of the structural shapes 22 after they have entered the shape loading apparatus 21.

Referring to FIG. 2, there is shown an enlarged view of the shape loading apparatus 21. As there indicated, the support carriages 23–26 include elongated transverse support beams 31–34, respectively. Though a lesser number is shown in FIG. 1 for simplicity of illustration, it is intended that the shape loading apparatus 21 should be capable of supporting a group of eight structural shapes in a side-by-side manner. For this reason, the mid portion of the apparatus 21 is broken away and not shown in FIG. 2. The first two and last two of the structural shapes are indicated at 22a and 22b and at 22g and 22h, respectively, it being understood that four additional shapes (22c–22f) are located intermediate the shapes 22b and 22g. As further indicated in FIG. 2, each of the support carriages 23–26 includes a series of eight shape positioning units (the middle four not being shown) which are supported by and transversely spaced along the support beam for such carriage. The shape positioning units for the first support carriage 23 are indicated at 35a–35h and are supported by the transverse support beam 31. The shape positioning units for the second support carriage 24 are indicated at 36a–36h and are supported by the transverse support beam 32. The shape positioning units for the third support carriage 25 are indicated at 37a–37h and are supported by the transverse support beam 33. The shape positioning units for the fourth support carriage 26 are indicated at 38a–38h and are supported by the transverse support beam 34.

The support carriages 23–26 are coupled to one another by means of intercarriage coupling beams 39–44, a pair of these coupling beams extending between each adjacent pair of the support carriages 23–26. These coupling beams 39–44 enable the carriages 23–26 to move in unison along the carriage tracks 27 and 28. As will be seen, these coupling beams 39–44 are provided with rack members for enabling adjustment of the spacings between the carriages 23–26.

Before proceeding further, it should be noted that the structural shapes which the shape loading apparatus 21 is capable of handling may take the form of, for example, I-beams, T-beams, angles, channels or flat bars. For sake of an example, the structural shapes shown in the drawings are in the form of angle beams.

Referring to FIG. 3 there is shown a front elevational view of the right-hand half (looking downstream of the second support carriage 24. This view is taken along section line 3—3 of FIG. 2. Referring also to FIG. 4, this view is a side elevational view taken along section line 4—4 of FIG. 3 and shows the front half of the support carriage 24. As indicated in FIG. 3, the shape positioning units 36a–36h (only the first four of which are shown in this partial view) are supported from the lower side of the transverse support beam 32 and are positioned at different locations across the length of such support beam 32. The structural shape 22a–22h are guided in individual T-shaped passageways 45a–45h in the shape positioning units 36a–36h.

As indicated by the presence of the structural plate 20, FIG. 3 shows the support carriage 24 for the case where it is positioned at the loading station 15 (FIG. 1). The structural plate 20 is supported by the conveyor rollers 16 which are eventually used to move the combined shape and plate load to the next work station. These conveyor rollers 16 are rotatably supported by means of support members 46 which are individually embedded in concrete footing members 47. Appropriate side rollers, one of which is indicated at 48, are provided for keeping the plate 20 centered on the conveyor system formed by conveyor rollers 16. These side rollers are of a retractable nature. For this reason, the side roller 48 is rotatably mounted on a support plate 49 which is pivotally connected at one end to a support bracket 50 which is attached to the right-hand conveyor roller support member 46. A hydraulic piston and cylinder mechanism 51 is coupled to the other end of the support plate 49 and is adapted to retract the side roller 48 by pivoting the support plate 49 in a downwardly direction.

As seen in FIGS. 3 and 4, the support carriage 24 includes a first carriage truck 52 having a plurality of wheels 53 which ride on the right-hand carriage track 28. A second carriage truck (not shown) of this same construction is provided at the other end of the support beam 32 and rides on the left-hand carriage track 27. The transverse support beam 32 is supported above the carriage truck 52 by means of an elevator mechanism which is generally indicated at 54. This elevator mechanism includes an end panel 55 which is welded to the right-hand end of the transverse support beam 32 and which includes a sleeve portion 56 which rides on a vertical guide column 57. The guide column 57 in turn rests on and is attached to the top of the carriage truck 52. A jack mechanism 58 having a jack screw 59 is used for raising and lowering the end panel 55 on the guide column 57. The jack screw 59 passes through an internally-threaded lifting plate mechanism 60 which is fastened to the end panel 55. A motor 61 is mounted on the carriage truck 52 and is coupled to the jack mechanism 58 for purposes of actuating same. This motor 61 is also coupled to a second jack mechanism (not shown) located on the rear half of the carriage truck 52, this rear half being of the same construction as the front half. A corresponding elevator mechanism of the same form of construction is provided at the other or left-hand end of the transverse support beam 32.

The carriage track 28 is supported on a longitudinally extending support beam 62 which in turn is embedded in a longitudinally extending concrete footing 63. The carriage truck 52 includes a motor 64 which is coupled to one or more of the truck wheels 53 for purposes of moving the carriage truck 52 along the track 28.

As indicated in FIG. 3, an intercarriage spacing mechanism 65 is mounted on the carriage truck 52 for cooperating with the intercarriage coupling beams 40 and 42 for enabling adjustment of the spacing or separation between the carriage 24 and the carriages 23 and 25 which are located in front of and behind the carriage 24. This intercarriage spacing mechanism 65 includes a pair of drive gears 66 and 67. The drive gear 66 engages a longitudinally extending rack member 68 which is fastened to the adjacent side of the intercarriage coupling beam 40. The second drive gear 67 engages a longitudinally extending rack member 69 which is fastened to the adjacent side of the lower intercarriage coupling beam 42. The drive gear 66 is actuated by a drive motor 70, while the drive gear 67 is operated by an additional drive motor located behind the motor 70 and hence not visible in FIG. 3. Rack members 68 and 69 extend the length of the coupling beams 40 and 42, respectively.

Referring now to FIG. 5 of the drawings, there is shown a cross-sectional view taken along section line 5—5 of FIG. 3. This shows the cross-sectional shape of the transverse support beam 32, as well as the internal constructional details of the shape positioning unit 36a. As there seen, the transverse support beam 32 is of a box beam type of construction and is provided with horizontal flanges or feet 71 and 72 at the lower ends of the front and back portions of the beam 32. The shape positioning unit 36a includes a positioning unit carriage 73 which is movably mounted on the beam flanges 71 and 72 by means of sets of front and back rollers 74 and 75. As such, the positioning unit carriage 73 is adapted to move in a lengthwise direction along the beam 32, which direction is transverse to or at right angles to the carriage tracks 27 and 28 (FIG. 2).

Attached to the underside of the positioning unit carriage 73 are forward and rearward short guide roller mechanisms 76 and 77. As will be seen, these guide roller mechanisms serve to maintain the structural shape 22a in an upright position as such shape 22a passes through the shape positioning units 36a. Attached to the underside of the positioning unit carriage 73 intermediate the guide roller mechanism 76 and 77 is a shape driver mechanism 78. As will be seen, this shape driver mechanism 78 serves to cause movement of the structural shape 22a through the positioning unit 36a when such driver mechanism 78 is activated. Slidably mounted on the rearward end of the positioning unit carriage 73 is a long guide roller mechanism 79. Attached to the rearward side of the transverse support beam 32 is an elevator mechanism 80 for raising and lowering the long guide roller mechanism 79. This long guide roller mechanism 79 is retracted and is not used when the vertical dimension of the structural shape is relatively short. The retracted position is the one shown in FIG. 5. Located on the upper side of the positioning unit carriage 73 is a positioning unit spacing mechanism 81. As will be seen, the spacing mechanism 81 serves to adjust the position of the positioning unit carriage 73 along the transverse support beam 32.

Considering first the details of construction of the rearward short guide roller mechanism 77, such details will be explained with the aid of what is shown in FIG. 5 as well as what is shown in the cross-sectional view of FIG. 6, this being a cross-sectional view taken along the section line 6—6 of FIG. 5. As indicated in FIG. 5, the short guide roller mechanism 77 includes an upper support member 82 which is attached to the underside of the positioning unit carriage 73 and front and back plates 83 and 84 which are secured to the support member 82. The front and back plates 83 and 84 are each provided with a T-shaped opening, these openings forming part of the T-shaped passageway 45a shown in FIG. 3. As indicated in the front view of FIG. 6, the guide roller mechanism 77 is provided with a side plate 85 which is fastened to the right-hand side of the support member 82. As further indicated in FIG. 6, the guide roller mechanism 77 includes a pair of guide rollers 86 and 87 for engaging opposite sides of the structural shape 22a.

The left-hand guide roller 86 is rotatably mounted on a movable member 88 which, as shown in the view of FIG. 6, may be moved from left to right or vice versa with respect to the support member 82 for purposes of enabling the shape positioning unit 36a to accommodate structural shapes of different dimensions. This movable member 88 is provided with horizontally extending front and back keyways, the back one of which is indicated in outline form at 89, which cooperate with mating key members which extend inwardly from the inner sides of the lower portions of the front and back plates 83 and 84 (FIG. 5). Movement of the movable member 88 is controlled by a keyed control shaft 90 which extends through the guide roller mechanism 77. Such shaft 90 includes a keyway 90a which runs the length thereof. Among other things, the keyed control shaft 90 passes through an externally threaded sleeve member 91 which is rotatably mounted in the support member 82. A flanged head portion 92 of the sleeve member 91 is held in place by suitable bearing elements 93 and 94. A key member 95 is mounted in an appropriate recess in the inner wall of the sleeve member 91 and extends inwardly into and mates with the keyway 90a in the control shaft 90. As a consequence, rotation of the control shaft 90 causes rotation of the sleeve member 91. The externally threaded portion of the sleeve member 91 cooperates with an internally threaded nut member 96 which is fastened to the movable member 88. As a consequence, rotation of the sleeve member 91 causes the movable member 88 to move from right to left or vice versa, depending on the direction of rotation of the control shaft 90.

The right-hand guide roller 87 is rotatably mounted on a movable block member 97 having horizontally extending keyways 98 formed in the front and rear walls thereof. These keyways mate with inwardly extending key members which are fastened to the front and back plates 83 and 84 (FIG. 5). This allows sliding movement of the block member 97 from right to left or vice versa in FIG. 6. The right-hand end of the sliding block member 97 is fastened to the end of a piston 99 which forms part of a hydraulic ram mechanism 100. The ram mechanism 100 is mounted on the support member 82 and, when fully energized, serves to urge the guide roller 87 against the structural shape 22a with a substantial amount of force.

The forward short guide roller mechanism 76 (FIG. 5) is of the same construction as that just described for the rearward mechanism 77. A keyed control shaft 101 extends through this forward mechanism 76 for purposes of adjusting the spacing or gap between the pair of guide rollers located therein. The long guide roller mechanism 79 is also of this same form of construction except that the pair of guide rollers contained therein are of greater vertical length. A further keyed control shaft 102 passes through the long guide roller mechanism 79 for purposes of adjusting the gap between the pair of guide rollers located therein.

Figure 7:
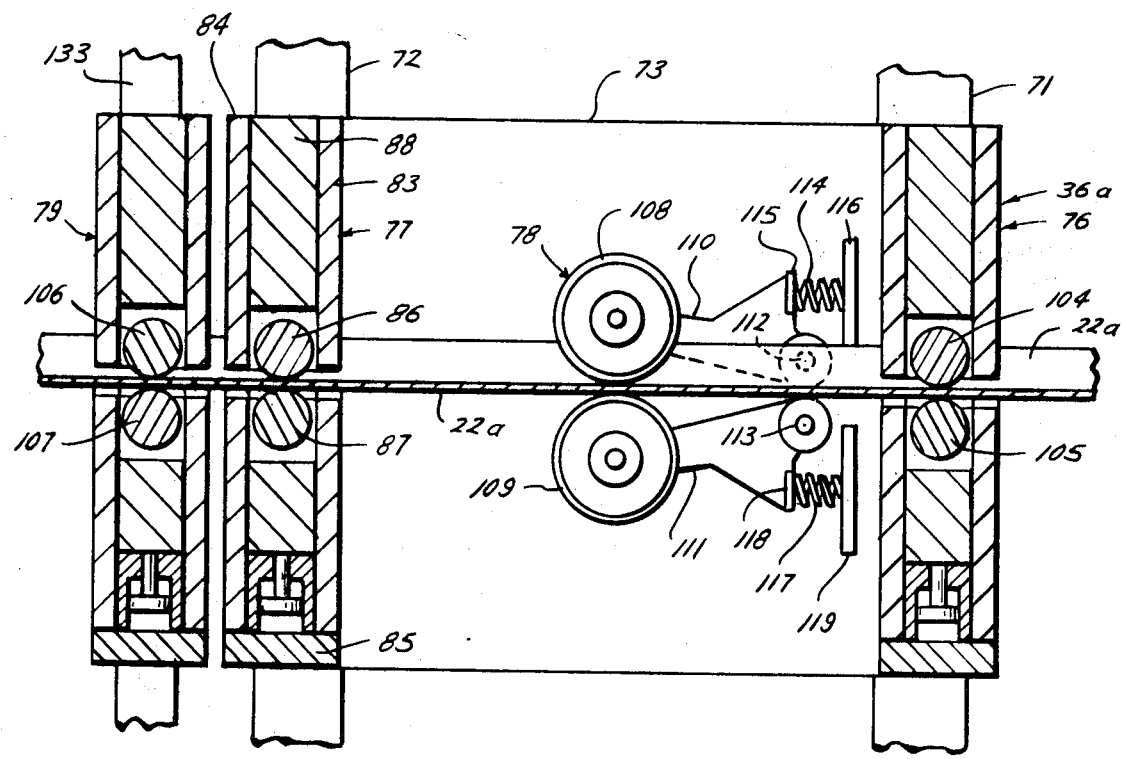
FIG. 7 is a cross-sectional view taken along section line 7—7 of FIG. 5 and showing a bottom view of the FIG. 5 support carriage structure.

Referring now to FIG. 7 of the drawings, there is shown a bottom view of the shape positioning unit 36a. This view is taken along section line 7—7 of FIG. 5 except that, for purposes of explanation, the long guide roller mechanism 79 is illustrated as though it were in its lowered or shape engaging position. The pair of guide rollers for the forward short guide roller mechanism 76 are indicated at 104 and 105. The guide rollers for the long guide roller mechanism 79 are indicated at 106 and 107.

Considering now the shape driver mechanism 78, such mechanism includes a pair of drive rollers 108 and 109 which are urged against opposite sides of the vertical portion of the structural shape 22a and which operate, when energized, to advance the structural shape 22a through the shape positioning unit 36a. The drive roller 108 is rotatably mounted on a first arm member 110, while the drive roller 109 is rotatably mounted on a second arm member 111. These arm members 110 and 111 are pivotally mounted on the underside of the positioning unit carriage 73 by means of shaft members 112 and 113, respectively, the shaft member 112 lying above the flange of the shape 22a in FIG. 7. A coil spring 114 is mounted between a shoe plate 115 attached to the arm member 110 and a bracket plate 116 attached to and extends downward from the underside of the carriage 73. In a similar manner, a second coil spring 117 is mounted between a shoe plate 118 on the arm member 111 and a bracket plate 119 which is attached to and extends downward from the underside of the carriage 73. Coil springs 114 and 117 operate to force the drive rollers 108 and 109 against opposite sides of the vertical portion of the structural shape 22a with a substantial amount of force.

Returning now to FIG. 5 and considering the side view of the shape driver mechanism 78 as there shown, it is seen that the drive roller 108 is rotatably mounted on a downwardly extending bearing arm 120 which is attached to the end of the arm member 110. The shaft member 112 located at the right-hand end of the arm member 110 (see FIG. 7) is actually the end portion of a drive shaft 121 of a driving motor 122. This motor 122 is mounted on the upper side of the positioning unit carriage 73 and the drive shaft 121 extends downwardly through a suitable passageway in the carriage 73. Also mounted on this drive shaft 121 is a sprocket 123 which is coupled by means of a link-type chain 124 to a second sprocket 125 which is mounted on the shaft of the drive roller 108, such shaft extending through a suitable passageway in the bearing arm 120. A similar form of sprocket and chain construction is provided for the other drive roller 109 (not visible in FIG. 5). Also mounted on the motor drive shaft 121 is a drive gear 126. This drive gear 126 meshes with a corresponding drive gear (not shown) which is mounted on the shaft member 113 of the second arm member 111. These drive gears, together with the two sets of sprockets and chains, enable the motor 122 to drive the two drive rollers 108 and 109 when it is desired to cause movement of the structural shape 22a.

Consideration will now be given to the elevator mechanism 80 (FIG. 5) which is used to raise and lower the long guide roller mechanism 79. This elevator mechanism 80 includes a secondary support beam 130 which is fastened to the underside of a jack mechanism 131 which, in turn, is supported from a support plate 132 which is mounted on and extends from the back side of the transverse support beam 32. Attached to the bottom end of the support beam 130 is a T-shaped track member 133. The secondary support beam 130, the support plate 132 and the track member 133 extend in a transverse direction (perpendicular to the paper in FIG. 5) for almost the entire length of the transverse support beam 32. This can be seen in FIG. 2 wherein is shown the elongated support plate 132. The reason for this construction is that the secondary support beam 130, the support plate 132 and the track member 133 are used in connection with the long guide roller mechanisms of each of the shape positioning units 36a-36h. This enables all of the long guide roller mechanisms to be raised and lowered in unison.

The jack mechanism 131 shown in FIG. 5 represents a first of a pair of such jack mechanisms which are located near the two ends of the secondary support beam 130. A jack screw 134 of the jack mechanism 131 is threaded through a suitable internally threaded nut member which is secured to the support plate 132. A drive shaft 135 for the jack mechanism 131 is connected to a drive motor which is mounted on the secondary support beam 130 near one end thereof. A series of spaced apart bracket plates 136 assist in supporting the support plate 132 from the rear of the transverse support beam 32. The secondary support beam 130 is slidably coupled to the rear side of the transverse support beam 32 by means of a dovetail mechanism 137. This dovetail mechanism includes a plate member 138 attached to the rear side of the transverse support beam 32 and having a vertically extending dovetail shaped slot cut therein. Such dovetail mechanism 137 further includes a bracket plate 139 which is secured to the secondary support beam 130 and which includes a dovetail shaped key which rides in the slot in the plate member 138. Three of these dovetail mechanisms are spaced apart along the secondary support beam 130.

The long guide roller mechanism 79 is attached to the underside of a carriage member 140 which is supported from the track member 133 by means of carriage-mounted rollers 141 and 142. This enables movement of the long guide roller mechanism 79 along the track member 133. This long guide roller mechanism 79 is slidably coupled to the rearward end of the positioning unit carriage 73 by means of a slide coupling mechanism 143 which permits vertical but not horizontal movement of the guide roller mechanism 79 with respect to positioning unit carriage 73. This slide coupling mechanism 143 includes guide members 144 which are fastened to the positioning unit carriage 73 and which define a passageway in which slides a T-shaped sliding block which is fastened to the upper portion of the front plate of the long guide roller mechanism 79.

Referring now to FIG. 8 of the drawings, there is shown a plan type cross-sectional view taken along section line 8—8 of FIG. 5. This view shows in a somewhat better manner the nature of the vertical slide coupling mechanism 143 which slidably couples the long guide roller mechanism 79 to the back end of the positioning unit carriage 73. In particular, the T-shaped sliding block is indicated at 145. This block is fastened to the upper end of the front plate of the long guide roller mechanism 79 by means of a threaded bolt 146. The guide members 144 serve to prevent the T-shaped sliding block 145 from undergoing any appreciable horizontal movement, while enabling the block 145 to move or slide in a vertical direction.

FIG. 8 further shows the details of the positioning unit spacing mechanism 81 located on the top side of the positioning unit carriage 73. This spacing mechanism 81 includes three major subassemblies or mechanisms. It includes a locking mechanism 147 for locking the positioning unit carriage 73 to the flange portions 71 and 72 of the transverse support beam 32 when so desired. It also includes a pair of clutch mechanisms 148 and 149 for selectively coupling the positioning unit carriage 73 to a lead screw 150 for causing transverse movement of the carriage 73.

The locking mechanism 147 includes a wedge member 151 and a pair of movable clamping shoes 152 and 153 which rest on the top surface of the positioning unit carriage 73. The clamping shoe 153 extends under the lead screw 150 and engages the inner edge of the rearward flange member 72. A cutout 152a is provided in the clamping shoe 152 so that the motor 122 will not interfere with the movement of the shoe 152. A first series of ball bearings 154 is located between the front clamping shoe 152 and the wedge member 151, while a second series of ball bearings 155 is located between the wedge member 151 and the rear clamping shoe 153. Suitable coil springs, such as spring 156, keep these ball bearings grouped together during movement of the wedge member 151. Mounted on the wedge member 151 is a hydraulic ram mechanism 157. One end of this ram mechanism 157 rests against a retaining block 158 which is attached to the wedge member 151, while a piston element 159 of the ram mechanism 157 rests against the raised side portion of the positioning unit carriage 73. The ram mechanism 157 is held in place by means of a retaining clamp 160.

When the ram mechanism 157 is energized, the piston 159 thereof is caused to push against the side of the carriage 73 which, in turn, moves the wedge member 151 toward the opposite side of the carriage 73. This movement forces the clamping shoe 152 in a forward direction (to the right in FIG. 8) and up against the inner edge of the flange member 71. This movement of the wedge member 151 also forces the second clamping shoe 153 to move in a rearward direction (to the left in FIG. 8) and up against the inner edge of the rear flange member 72. This locks the positioning unit carriage 73 to the flange members 71 and 72 and thus prevents any transverse movement of the positioning unit carriage 73 along such flange members 71 and 72.

The clutch mechanism 148 includes an internally threaded sleeve member 161 which is threaded onto the lead screw 150. A flexible metal strap or band 162 (the top portion of which is broken away and not shown in FIG. 8) passes over the sleeve member 161 and the two free ends of such flexible band 162 are bolted to a block member 163. The block member 163 is prevented from rotating around lead screw 150 (when such lead screw is energized) by means of an upper plate member (not shown) which extends between and is fastened to the tops of the two upwardly extending side portions of the carriage 73. (The clutch mechanisms 148 and 149 must float in a confined horizontal plane; otherwise the lead screw 150 could be undesirably transversely stressed.) Located intermediate the block member 163 and the sleeve member 161 are a hydraulic ram mechanism 164 and a brake block 165. The hydraulic ram mechanism 164 includes a piston member (not shown) which is urged against the inner surface of the block member 163 when the ram mechanism 164 is energized. At the same time, the rear part of the ram mechanism housing is urged against the brake block 165. Thus, energizing of the ram mechanism 164 serves to engage the clutch mechanism 148. In other words, activation of the ram mechanism 164 forces the brake block 165 against the sleeve member 161, thus preventing further rotation thereof. This, in turn, causes the sleeve member 161 and hence the positioning unit carriage 73 to advance its position along the lead screw 150 when such lead screw 150 is being rotated. Conversely, when the ram mechanism 164 is de-energized, then the sleeve member 161 is free to turn or rotate with the lead screw 150. When this occurs, the sleeve member 161 merely sits and idles in the same position along the lead screw 150.

The second clutch mechanism 149 is constructed in the same manner as the first clutch mechanism 148. A flexible metal strap or band 166, corresponding in function to the band 162 of the first clutch mechanism, is shown in full for the case of the second clutch mechanism 149. The second clutch mechanism 149 is fastened to the other side of the positioning unit carriage 73. A spacer member 167 in the form of an unthreaded sleeve is located between the seleve member 161 of the first clutch mechanism 148 and a corresponding sleeve member 168 of the second clutch mechanism 149. The spacer member 167 maintains the desired spacing between the two sleeve members 161 and 168. The ram mechanisms associated with the clutch mechanisms 148 and 149 are preferably actuated by a common hydraulic source so that the engaging and disengaging of the two clutch mechanisms will occur at the same time.

Returning now to FIG. 5, consideration will be given to the manner of supporting the transverse conveyor system formed by the conveyor rollers 19. As indicated in FIG. 5, these conveyor rollers 19 are located intermediate the various sets of conveyor rollers 16 which provide for longitudinal movement of the shape and plate loads along the manufacturing flow stream. These transverse conveyor system rollers 19 are rotatably supported by upwardly extending support beams 170 which, in turn, are mounted on a series of longitudinally extending elevator beams 171. The longitudinal elevator beams 171, are, in turn, supported by a set of elevator mechanisms, one of which is indicated at 172. These elevator mechanisms are located at appropriate points under the conveyor system formed by the conveyor rollers 19. These elevator mechanisms, such as the one indicated at 172, may be of the hydraulic piston and cylinder type and serve to raise and lower the conveyor rollers 19 for purposes of enabling the structural plates (e.g., plate 20) to be loaded onto the longitudinal conveyor system formed by conveyor rollers 16.

FIGS. 5–8 have shown in considerable detail the manner of construction of a single one of the shape positioning units, namely, the first shape positioning unit 36a located on the support carriage 24. Each of the remaining shape positioning units 36b–36h on the support carriage 24 is constructed in this same manner.

As indicated in FIG. 3, the keyed control shaft 101 passes through each of the shape positioning units 36a–36h and extends practically the entire length of the transverse support beam 32. It is used to adjust the gap spacing between the forward pairs of short guide rollers in the various shape positioning units 36a–36h. This keyed control shaft 101 is supported from the transverse support beam 32 at the two ends thereof by means of appropriate support brackets including suitable bearing elements for allowing rotation of the shaft 101. The support bracket for the right-hand end of the shaft 101 is indicated at 173. Further means are also located at the right-hand end of the shaft 101 for producing rotation of such shaft 101 at the desired times. This means includes a motor 174 which is coupled to the right-hand end of the shaft 101 by means of sprockets 175 and 176 and a coupling chain 177. Activation of the motor 174 thus causes rotation of the keyed control shaft 101. The motor 174 is supported within the confines of the transverse support beam 32 by means of appropriate mounting brackets (not shown).

The keyed control shaft 90 for the rearward short guide roller mechanisms (e.g., 77 of FIG. 5) likewise extends practically the entire length of the transverse support beam 32. It is mounted and driven in the same manner as that shown for the forward keyed control shaft 101. If desired, an appropriate gearing arrangement may be provided so that the motor 174 can be used to drive both the forward and rearward short guide roller control shafts 101 and 90. The keyed control shaft 102 for the long guide roller mechanisms (e.g., 79 of FIG. 5) located at the rearward ends of the shape positioning units 36a–36h also extends practically the entire length of the transverse support beam 32. In this case, however, the mounting bracket and the driving motor for this control shaft 102 are secured to the track member 133 associated with the secondary support beam 130 (FIG. 5).

The motor for driving the lead screw 150 which passes through the spacing mechanisms associated with the shape positioning units 36a–36h is indicated at 178 in FIG. 3. It is appropriately mounted within the confines of the transverse support beam 32 and is connected to the right-hand end of the lead screw 150. The motor for driving the drive shaft 135 for the elevator jack mechanisms 131 is indicated at 179 in FIG. 3. This motor 179 is mounted on the right-hand end of the secondary support beam 130 (FIG. 5). Actuation thereof serves to raise and lower the long guide roller mechanisms (e.g. 79 of FIG. 5) of the various shape positioning units 36a–36h.

The fourth support carriage 26 (FIG. 2) is constructed in the same manner as the second support carriage 24, this second support carriage 24 being the one that has been considered in detail up to this point. The various shape positioning units 38a–38h on the fourth support carriage 26 are constructed in the same manner as that considered in FIGS. 5–8 for the shape positioning unit 36a. The first and third support carriages 23 and 25 are also constructed in the same manner as the second support carriage 24 with one major exception. In particular, the shape positioning units of the first and third support guide roller mechanisms corresponding to the long guide roller mechanism 79 (FIG. 5) of the shape positioning unit 36a. As a consequence, these first and third support carriages 23 and 25 also do not include any elevator mechanisms corresponding to the elevator mechanism 80 (FIG. 5) of the second support carriage 24, which elevator mechanism is for the purpose of raising and lowering the long guide roller mechanisms. Except for this, the construction of the first and third support carriages 23 and 25 and the various shape positioning units located thereon are of the same construction as indicated for the second support carriage 24 and its shape positioning units 36a–36h.

Referring now to FIGS. 9 and 10, there will be described in greater detail the mechanisms for adjusting the spacings between the support carriages 23–26. These are schematic type views in the sense that only the elements necessary for understanding the spacing adjustment process are shown. FIG. 9 shows the case where maximum spacing is provided between the carriages 23–26, while FIG. 10 shows the case where minimum spacing is provided. The spacing mechanism drive gears 66 and 67 located on the right-hand side (looking downstream) of the second support carriage 24 were previously considered. The corresponding drive gears for the other side of the support carriage 24 are indicated at 180 and 181. Drive gears for the third support carriage 25 are indicated at 182–185. As previously mentioned, the intercarriage coupling beams 39–44 are provided with rack members which extend the length of these coupling beams and which engage the appropriate ones of the various drive gears 66, 67 and 180–185. The forward pair of coupling beams 39 and 40 is anchored to the two sides of the first support carriage 23 as indicated at 187 and 188, respectively. Similarly, the rearward pair of coupling beams 43 and 44 is anchored to the two sides of the fourth support carriage 26 as indicated at 189 and 190, respectively.

A first driving motor is provided for driving the forward two drive gears 66 and 180 of the carriage 24, while a second driving motor is provided for driving the rearward two drive gears 67 and 181. The first of these motors is indicated at 70 in FIG. 3 and, as there indicated, is located at the right-hand side of the support carriage 24. This motor 70 is coupled by way of an appropriate linkage system extending transversely through the interior of the transverse support beam 32 to the drive gear 180 located at the opposite side of the support carriage 24. A similar construction is provided for the rearward motor and the rearward drive gears 67 and 181. In a similar manner, a forward driving motor and linkage system (not shown) are provided for the forward drive gears 182 and 184 of the third support carriage 25, while a rearward driving motor and linkage system is provided for the rearward drive gears 183 and 185 of such carriage 25. All of these motors are of the reversible type.

Assuming initially that the carriages 23–26 are in the FIG. 9 condition, then if the drive motors are activated so as to produce clockwise rotation of drive gears 66, 67, 184 and 185 and counterclockwise rotation of drive gears 180, 181, 182 and 183, such rotation causes movement of the coupling beams 39–44 such that the carriages 23–26 are drawn towards one another. The limit of this movement is indicated in FIG. 10 which shows the case where the carriages 23–26 have been drawn together to the point where the side trucks of adjacent carriages abut against one another. By reversing the direction of rotation of the driving motors and hence the various drive gears, a reverse type of movement is provided, or, in other words, the carriages 23–26 are caused to spread apart or move away from one another. As indicated in FIG. 10, the inner drive gears 66 and 183 and their associated coupling beams 40 and 44 must be positioned so as to allow for the coupling beam 40 sliding past the coupling beam 44 without interfering or colliding therewith. This same consideration applies to the corresponding gears and beams on the opposite side of the carriages 23–26.

The various motors discussed above in connection with FIGS. 3–5, 9 and 10 may be of either the electric or hydraulic type. The various switches and valves for controlling these motors, as well as the valves for controlling the various hydraulic ram mechanisms and elevator mechanisms, are mounted on a master control panel (not shown) which is located adjacent the loading machine in such a manner so that a human operator standing at the master control panel is in a position to readily observe the loading operation. Such master constrol panel may also be provided with various indicating devices and meters for indicating the heights and spacings of the various elements of the machine.

OPERATION OF THE PREFERRED EMBODIMENT

Considering now the overall operation of the loading machine of FIGS. 1–10, it is initially assumed that the shape loading carriages 23–26 are located in the shape receiving region at the right-hand end of the carriage tracks 27 and 28 as shown in FIG. 1. Initially, the desired support carriage and positioning unit spacing adjustments are made. In particular, the carriage spacing motors (e.g., motor 70 of FIG. 3) are activated to establish the desired spacings between the support carriages 23–26. During this same initial stage of operation, the positions of the various shape positioning units on each of these support carriages 23–26 are adjusted. This is accomplished by use of the transverse lead screws (e.g., lead screw 150 of FIGS. 3 and 8), the locking mechanisms (e.g., locking mechanism 147 of FIG. 8) and the pairs of clutch mechanisms (e.g., clutch mechanisms 148 and 149 of FIG. 8) associated with each of the shape positioning units (e.g., units 36a–36h of FIG. 3). In some cases, it may be necessary to adjust the different shape positioning units one at a time. In other cases, the positions of two or more of the shape positioning units can be adjusted simultaneously.

For the case of the shape positioning unit 36a, for example, this transverse positioning adjustment is accomplished by first releasing the locking mechanism 147 and engaging the clutch mechanisms 148 and 149 (FIG. 8). The drive motor 178 (FIG. 3) is then activated to cause rotation of the lead screw 150 in the proper direction until the shape positioning unit 36a reaches the desired transverse position on the support beam 32. Rotation of the lead screw 150 is then halted, the locking mechanism 147 is again locked and the clutch mechanism 148 and 149 are disengaged. This process is then repeated for each of the other shape positioning units 36b–36h on the support carriage 34.

The positions of the shape positioning units on the other support carriages 23, 25, and 26 are adjusted in a similar manner. As indicated in FIG. 2, individual ones of the shape positioning units on any given support carriage are positioned so as to be in longitudinal shape receiving alignment with the corresponding ones of the shape positioning units on the other support carriages. For example, the first shape positioning unit 36a on the second support carriage 24 is positioned so as to be in longitudinal shape receiving alignment with the first shape positioning units 35a, 37a and 38a on the other support carriages 23, 25 and 26, respectively.

The gap spacings between the various pairs of guide rollers in the various shape positioning units is made by activating the various roller gap adjustment drive motors (e.g., motor 174 of FIG. 3) with the proper direction of rotation. The heights of the various transverse support beams 31–34 of the different support carriages 23–26 are adjusted with respect to the conveyor system 29 (FIG. 1) at the shape receiving position by actuating the various elevator mechanisms (e.g., elevator mechanism 54 of FIG. 3) located at the two sides of each of the support carriages 23–26. This height is adjusted in accordance with the vertical dimension of the structural shape such that the structural shapes will ride on the conveyor rollers 29a (FIG. 1) as they move into the shape positioning units during the shape loading operation. Following this operation, the long guide roller mechanisms (e.g., mechanism 79 of FIG. 5) associated with the second and fourth support carriages 24 and 26 are either lowered into their operative positions or else retracted out of the way, depending upon whether or not they are to be used. This is accomplished by activating the long guide roller elevator motors (e.g., motor 179 of FIG. 3) located on the second and fourth support carriages 24 and 26. At this point or at some earlier point in the initial set up process, the carriage drive motors (e.g., motor 64 of FIG. 4) are operated to move the support carriages 23–26 to the desired shape receiving position wherein the first carriage 23 is immediately adjacent the shape feeding machine 30 (FIG. 1).

With these initial adjustments accomplished, the loading operation is now ready to commence. The conveyor rollers 19 of the transverse conveyor system are elevated for purposes of receiving a structural plate from the plate supply apparatus 18. If the rollers 19 are of the powered type, then they are activated to assist in this plate loading process. In any event, after the structural plate (e.g., plate 20) has moved onto the conveyor rollers 19 and is in the proper position at the loading station 15, the conveyor rollers 19 are then lowered by means of the various elevator mechanisms (e.g., elevator mechanism 172 of FIG. 5) so as to deposit the structural plate on the longitudinal conveyor system formed by conveyor rollers 16.

At the same time, the structural shapes (e.g., shapes 22a–22h) are inserted into the shape loading apparatus 21 one at a time by the shape feeding machine 30. For example, the shape feeding machine 30 moves into longitudinal alignment with the right-hand set of shape positioning units 35a, 36a, 37a and 38a on the four support carriages 23–26. The machine 30 then feeds a structural shape 22a into the shape positioning units 35a, 36a, 37a and 38a. This feeding or loading operation is assisted by activating the shape driver mechanisms (e.g., mechanism 78 of FIG. 5) located in each of the shape positioning units 35a, 36a, 37a and 38a. When the structural shape 22a reaches the proper longitudinal position, the shape driver mechanisms are deactivated. The shape feeding machine 30 is then moved into longitudinal aligment with the next set of shape positioning units 35b, 36b, 37b and 38b and the foregoing loading process is repeated for this set of units. In this manner, a complete set of structural shapes 22a–22h is loaded into the loading apparatus 21. At this point, the various ram mechanisms associated with the guide rollers (e.g., ram mechanism 100 of FIG. 6) are energized to cause the guide rollers to firmly engage and hold the structural shapes 22a–22h.

After the structural shapes 22a–22h are loaded in the shape loading apparatus 21, the elevator mechanisms (e.g., elevator mechanism 54 of FIG. 3) which support the transverse support beams 31–34 of the support carriages 23–26 are then activated so as to raise the structural shaped 22a–22h off of the conveyor system 29. The structural shapes are raised a sufficient distance so that they will clear the structural plate 20 at the loading station 15. The various carriage drive motors (e.g., motor 64 of FIG. 4) are then activated so as to move the support carriages 23–26 as a group along the carriage tracks 27 and 28 until the structural shapes 22a–22h are in the proper position above the structural plate 20. The carriage motors are then deactivated and the carriage transverse support beam elevator mechanisms are operated to lower the structural shapes 22a–22h onto the structural plate 20.

The combined shape and plate load is now ready to be transferred to the next working station or manufacturing station indicated at 17 in FIG. 1. This transfer is accomplished by energizing the shape driver mechanisms (e.g., mechanism 78 of FIG. 5) associated with each of the shape positioning units, as well as by activating the driving system for the conveyor rollers 16 of the longitudinal conveyor system which is supporting the structural plate 20. At this time, the pressure exerted by the ram mechanisms associated with the guide rollers can be reduced by an appropriate amount.

After this shape and plate load has been transferred to the next manufacturing station 17, the support carriages 23–26 are returned to the right-hand shape receiving position of FIG. 1 and the foregoing loading operations are again repeated. This overall process is repeated until the desired number of structural panels has been manufactured. Any time it is desired to change the positions of the structural shapes on the structural plate, the appropriate position adjustments are made for the support carriages 23–26 and the shape positioning units located thereon.

Referring now to FIGS. 11 and 12, there are shown various patterns or configurations A–H in which the shapes may be placed on the structural plate. As there seen, two or more shorter lengths of structural shapes may be used in place of a single long length of structural shape which extends the length of the structural plate. Also, the same lengths of structural shapes need not be used in any given line of shapes (note pattern G). Also, the beginning points and end points of structural shapes in neighboring lines need not be at the same longitudinal locations along the structural plate. Further, if desired, the structural shapes in some or all of the lines may be made to extend or overhang a short distance beyond either the leading or trailing edge of the structural plate.

FIG. 11 shows a structural plate 201 having a shape configuration such that the shape loading apparatus 21 (carriages 23–26) is required to make two trips to the loading station 15 before the plate 201 is completely filled. In other words, the shapes shown in FIG. 11 represent a first load of shapes deposited on a first trip of the shape loading apparatus 21 to the loading station 15. The remainder of the plate 201 is filled during a second trip of the shape loading apparatus 21. The relative spacings of the support carriages 23–26 are indicated in outline form in FIG. 11 for the first trip of the shape loading apparatus 21. FIG. 12 shows a different configuration of structural shapes which may be loaded onto a subsequent structural plate 202. In the FIG. 12 case, the structural plate 202 is completely loaded during one trip of the shape loading apparatus 21.

The shape configurations and patterns shown in FIGS. 11 and 12 are in no way exhaustive of the various shape patterns that can be provided by the loading machine herein described. A wide variety of patterns can be readily accommodated.

An advantage of the loading machine described herein is its versatility. It may be used to load a wide variety of structural shape types, such as I-beams, T-beams, angle beams, channel beams, flat bars and the like. It can be used to provide a wide variety of different patterns and spacings for the structural shapes. In addition, the adjustments which are necessary to change from one size or type of structural shape to another or from one shape pattern to another can be accomplished fairly rapidly and with a minimum of effort. If at some point in the manufacturing process it is desired to switch to a different size or type or spacing for the structural shapes, then the human operator merely has to discontinue the manufacturing operation for a few moments while he makes the necessary adjustments with the switches and valves located on the master control panel.

A further advantage of the present loading machine is that it may be readily adapted for operation in an automatic manner. For example, the plate loading and shape loading operations, the raising and lowering of the shape loading apparatus, the movement of the shape loading apparatus from the shape receiving position to the plate loading station and the subsequent feeding of the combined load to a further manufacturing station can be controlled by means of automatic control circuits and timing circuits, together with the use of appropriate position sensing devices for signaling the control circuits when the shapes and plates are present at different positions in the machine. As a further step in the automation process, the making of the various adjustments which are required when changing to a different size or type or spacing for the structural shapes can also be automated. This is accomplished by using a program control unit which is preprogrammed in accordance with the sequences in which the different shape parameters will occur.

What is claimed is:

1. A loading machine for structural members comprising:
   (a) a loading station;
   (b) plate loading apparatus for moving a structural plate onto the loading station;
   (c) shape loading apparatus for simultaneously moving a plurality of structural shapes onto the structural plate;
   (d) a plurality of support carriages each including an elongated support beam and a plurality of shape positioning units supported by such support beam and positioned along the length of such support beam and individually adapted to receive and hold a structural shape, the different support beams being positioned parallel to one another and individual ones of the shape positioning units on any given carriage being adapted to be positioned in shape receiving alignment with individual ones of the shape positioning units on each of the other carriages; and
   (e) means for coupling the support carriages to one another for enabling such carriages to move in unison.

2. A loading machine in accordance with claim 1 which further includes track means for enabling the support carriages to move from a shape receiving position to a structural member loading station.

3. A loading machine in accordance with claim 1 wherein each of the support carriages includes elevator means for raising and lowering the corresponding elongated support beam and the loading machine includes means for actuating these elevator means for raising and lowering the various support beams in unison.

4. A loading machine in accordance with claim 1 wherein each support carriage includes means for adjusting the spacings between its shape positioning units.

5. A loading machine in accordance with claim 1 wherein each shape positioning unit includes a shape driver mechanism for engaging a structural shape and moving it through the positioning unit.

6. A loading machine in accordance with claim 1 wherein each shape positioning unit includes a pair of guide rollers for engaging opposite sides of a structural shape.

7. A loading machine in accordance with claim 6 wherein each of the shape positioning units further include a ram mechanism for urging one of the guide rollers of each pair against the structural shape.

8. A loading machine in accordance with claim 6 wherein each of the support carriages includes means for adjusting the position of one of the guide rollers of each pair with respect to its shape positioning unit for enabling the shape positioning units to accommodate structural shapes of different dimensions.

9. A loading machine in accordance with claim 8 wherein each shape positioning unit further includes a ram mechanism for urging the other guide roller of each pair against its side of the structural shape.

10. A loading machine in accordance with claim 1 wherein each shape positioning unit includes a plurality of pairs of guide rollers for engaging opposite sides of a structural shape at different positions along the shape.

11. A loading machine in accordance with claim 1 wherein the shape positioning units of some of the support carriages include pairs of long guide rollers and pairs of short guide rollers for engaging opposite sides of a structural shape and such support carriages include means for retracting the long guide rollers to an inoperative position when handling structural shapes having a relatively short dimension in a direction parallel to the axis of rotation of the guide rollers.

12. A loading machine for structural members comprising:
   a row of four support carriages for receiving and supporting structural shapes;
   a pair of drive gear mechanisms located on each of the second and third support carriages;
   first track means coupled to the first support carriage and extending to and engaging a first of the drive gear mechanisms on the second support carriage;
   second rack means coupled to the fourth support carriage and extending to and engaging a first of the drive gear mechanisms on the third support carriage;
   third rack means extending between and engaging the second drive gear mechanisms on each of the second and third support carriages;
   and motor means for actuating the drive gear mechanisms for enabling adjustment of the intercarriage spacings.

13. A loading machine for structural members comprising:
   a loading station including conveyor means for moving a load to a further work station;
   plate loading apparatus including conveyor means for moving a structural plate onto the loading station;

and shape loading apparatus including a plurality of support carriages for receiving and supporting structural shapes, track means for enabling the support carriages to move from a shape receiving position to the loading station and means for coupling the support carriages to one another for enabling such carriages to move in unison.

14. A loading machine in accordance with claim 13 wherein each support carriage includes an elongated support beam and a plurality of shape positioning units supported by such support beam and positioned along the length of such support beam and individually adapted to receive and hold a structural shape, the different support beams being positioned parallel to one another and individual ones of the shape positioning units on any given carriage being adapted to be positioned in shape receiving alignment with individual ones of the shape positioning units on each of the other carriages.

15. A loading machine in accordance with claim 14 wherein each of the support carriages further includes elevator means for raising and lowering the support beams in unison for enabling a plurality of structural shapes to be simultaneously moved over and lowered onto the structural plate at the loading station.

References Cited

UNITED STATES PATENTS

| | | | |
|---|---|---|---|
| 3,119,173 | 1/1964 | Glaser | 29—200 |
| 3,396,451 | 8/1968 | Di Margio et al. | 29—200 A |
| 3,399,445 | 9/1968 | Carroll | 29—200 A |

THOMAS H. EAGER, Primary Examiner

U.S. Cl. X.R.

29—200P

PO-1050
(5/69)

UNITED STATES PATENT OFFICE
CERTIFICATE OF CORRECTION

Patent No. 3,609,843            Dated      October 5, 1971

Inventor(s) HARRY J. FIEGEL, JR., ET AL

It is certified that error appears in the above-identified patent and that said Letters Patent are hereby corrected as shown below:

Column 3, line 56, after "15." insert --As--.
Column 4, line 67, change "shape" to --shapes--.
Column 10, line 27, change "seleve" to --sleeve--.
Column 11, line 44, after "support" insert --carriages 23 and
      25 are not provided with any long--.
Column 14, line 28, change "shaped" to --shapes--.
Column 16, line 58, change "track" to --rack--.

Signed and sealed this 21st day of March 1972.

(SEAL)
Attest:

EDWARD M. FLETCHER, JR.            ROBERT GOTTSCHALK
Attesting Officer                  Commissioner of Patents